United States Patent
Cheng et al.

(10) Patent No.: US 12,043,685 B2
(45) Date of Patent: Jul. 23, 2024

(54) POLYMERIZING SILICONE AND ACRYLIC MONOMERS

(71) Applicants: Rohm and Haas Company, Collegeville, PA (US); Dow Silicones Corporation, Midland, MI (US)

(72) Inventors: Yang Cheng, Midland, MI (US); Morris Wills, Philadelphia, PA (US); Hailan Guo, Warrington, PA (US); Nanguo Liu, Midland, MI (US)

(73) Assignees: Dow Silicones Corporation, Midland, MI (US); Rohm and Haas Company, Collegeville, PA (US)

( * ) Notice: Subject to any disclaimer, the term of this patent is extended or adjusted under 35 U.S.C. 154(b) by 728 days.

(21) Appl. No.: 17/259,635

(22) PCT Filed: Jul. 26, 2019

(86) PCT No.: PCT/US2019/043552
§ 371 (c)(1),
(2) Date: Jan. 12, 2021

(87) PCT Pub. No.: WO2020/023816
PCT Pub. Date: Jan. 30, 2020

(65) Prior Publication Data
US 2021/0317248 A1    Oct. 14, 2021

Related U.S. Application Data

(60) Provisional application No. 62/711,140, filed on Jul. 27, 2018.

(51) Int. Cl.
 C08F 290/14    (2006.01)
 C08K 5/41     (2006.01)
(52) U.S. Cl.
 CPC .......... C08F 290/148 (2013.01); C08K 5/41 (2013.01)

(58) Field of Classification Search
 CPC .................. C08F 290/148; C08K 5/41
 USPC .......................................... 524/156
 See application file for complete search history.

(56) References Cited

U.S. PATENT DOCUMENTS

| | | | |
|---|---|---|---|
| 4,994,522 A | 2/1991 | Sasaki et al. | |
| 7,153,899 B2 | 12/2006 | Reddy et al. | |
| 8,013,063 B2 | 9/2011 | Lee et al. | |
| 10,174,195 B2 | 1/2019 | Nakamoto et al. | |
| 2007/0167567 A1 | 7/2007 | Hashimoto et al. | |
| 2012/0264871 A1 | 10/2012 | Moon et al. | |

FOREIGN PATENT DOCUMENTS

| | | | |
|---|---|---|---|
| CN | 107151296 | 9/2017 | |
| CN | 107151296 A * | 9/2017 | ........... C08F 2/26 |
| EP | 0471993 A2 | 2/1992 | |
| EP | 1719787 | 11/2006 | |
| EP | 1841810 B1 | 5/2012 | |
| JP | 0471993 A2 * | 2/1992 | |
| WO | 20000034346 | 6/2000 | |
| WO | 2016158342 | 10/2016 | |

\* cited by examiner

*Primary Examiner* — Hui H Chin
(74) *Attorney, Agent, or Firm* — Brian L. Mutschler

(57) ABSTRACT

A method of making a collection of polymer particles comprising
(A) performing free radical polymerization (A) on an emulsion (E1) that comprises a collection of droplets dispersed in an aqueous medium, wherein the droplets comprise
  (i) one or more Si-containing monomers;
  (ii) one or more monovinyl acrylic monomers; and
  (iii) one or more graftlinkers that have no silicon atoms;
  to form a dispersion (D1) of core polymer particles in the aqueous medium;
(B) in the presence of the dispersion (D1) of core polymer particles, performing aqueous emulsion polymerization (B) on one or more acrylic monomers.

6 Claims, No Drawings

POLYMERIZING SILICONE AND ACRYLIC MONOMERS

Polymer particles with a core and a shell are useful for a variety of purposes. For example, when such particles have a core with a relatively low glass transition temperature (Tg) and a shell of relatively high Tg, the particles find utility for a variety of purposes, for example as impact modifiers. Impact modifiers are used as additives to a matrix polymer, and the presence of the impact modifier is intended to improve the impact resistance of the matrix polymer. When the modified matrix polymer is intended to be used outdoors, it is desired that the impact modifier resists degradation from weathering. When the modified matrix polymer is intended to be used at relatively high temperatures, it is desired that the impact modifier resists degradation from the high temperatures. Some impact modifiers contain silicone polymers and acrylic polymers, both of which are capable of forming low-Tg polymers, and both of which are generally considered to resist weathering and high temperatures. Some silicone polymers have extremely low Tg, which is considered advantageous for some impact modifiers. Silicone polymers are also considered to resist degradation at high temperature and to provide flame retardancy. However, silicone polymers are expensive.

US 2007/0167567 describes a polyorganosiloxane-containing graft copolymer, which is made by a process in which the first step is performing a first polymerization reaction on a modified siloxane that has a terminal group. This first polymerization reaction is performed under acidic conditions and produces a polymeric polyorganosiloxane having pendant vinyl groups. Then vinyl monomers undergo radical polymerization in the presence of this polyorganosiloxane.

It is desired to provide a composition that has the performance advantages of including silicone in the composition but that achieves those advantages while having a reduced amount of silicone in the composition. It also desired to provide a method of making such a composition. It is also desired to provide a composition that contains a matrix polymer such as polyvinyl chloride and that also contains polymer particles of such a composition.

The following is a statement of the invention.

A first aspect of the present invention is a polymer particle comprising
  (a) a core polymer comprising
    (i) polymerized units of one or more monomers selected from monomers of structure (I), monomers of structure (II), and mixtures thereof,

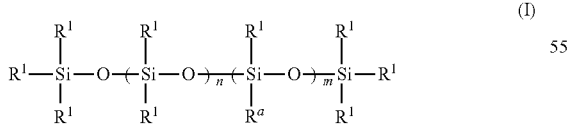

wherein every $R^1$ is independently hydrogen or a hydrocarbon group; n is 0 to 1,000; m is 2 to 1,000; p is 0 to 1,000; every $R^a$ is independently an organic group that contains one or more ethylenically unsaturated group;
    (ii) polymerized units of one or more monovinyl acrylic monomers (ii); and
    (iii) polymerized units of one or more graftlinkers that have no silicon atoms;
  (b) a shell polymer comprising polymerized units of one or more acrylic monomers.

A second aspect of the present invention is a polymer composition comprising polyvinyl chloride and a plurality of the polymer particles of claim 1, wherein the polymer particles of claim 1 are present in an amount of 1 to 10 parts by weight per hundred parts by weight of the polyvinyl chloride.

A third aspect of the present invention is a method of making a collection of polymer particles comprising
  (A) performing free radical polymerization (A) on an emulsion (E1) that comprises a collection of droplets dispersed in an aqueous medium, wherein the droplets comprise
    (i) one or more monomers selected from monomers of structure (I) (as defined above), monomers of structure (II) (as defined above), and mixtures thereof,
    (ii) one or more monovinyl acrylic monomers; and
    (iii) one or more graftlinkers that have no silicon atoms;
    to form a dispersion (D1) of core polymer particles in the aqueous medium;
  (B) in the presence of the dispersion (D1) of core polymer particles, performing aqueous emulsion polymerization (B) on one or more acrylic monomers.

The following is a detailed description of the invention.

As used herein, the following terms have the designated definitions, unless the context clearly indicates otherwise.

As used herein, a "polymer" is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Molecules that can react with each other to form the repeat units of a polymer are known herein as "monomers." The repeat units so formed are known herein as "polymerized units" of the monomer. A molecule having fewer than 100 repeat units of monomer is an oligomer, and a molecule having 100 or more repeat units of monomer is a polymer.

Vinyl monomers have the structure (III)

where each of $R^{21}$, $R^{22}$, $R^{23}$, and $R^{24}$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers are capable of free radical polymerization to form polymers. Aliphatic groups, including alkyl groups, may be linear, branched, cyclic, or a combination thereof.

Some vinyl monomers have one or more polymerizable carbon-carbon double bonds incorporated into one or more of $R^{21}$, $R^{22}$, $R^{23}$, and $R^{24}$ such vinyl monomers are known herein as multifunctional vinyl monomers. Vinyl monomers with exactly one polymerizable carbon-carbon double bond are known herein as monofunctional vinyl monomers.

Vinyl aromatic monomers are vinyl monomers in which each of $R^{21}$ and $R^{22}$ is hydrogen, $R^{23}$ is hydrogen or alkyl, and —$R^{24}$ has the structure (VI)

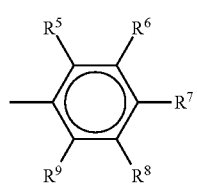

(IV)

where each of $R^5$, $R^6$, $R^7$, $R^8$, and $R^9$ is, independently, a hydrogen, a halogen, an aliphatic group (such as, for example, an alkyl group or a vinyl group), a substituted aliphatic group, an aryl group, a substituted aryl group, another substituted or unsubstituted organic group, or any combination thereof.

Acrylic monomers are vinyl monomers in which each of $R^1$ and $R^2$ is hydrogen; $R^3$ is either hydrogen or methyl; and $R^4$ has one of the following structures (V), (VI), or (VII):

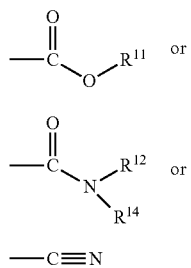

(V)

(VI)

(VII)

where each of $R^{11}$, $R^{12}$, and $R^{14}$ is, independently, hydrogen, a $C_1$ to $C_{14}$ alkyl group, or a substituted $C_1$ to $C_{14}$ alkyl group. As defined herein, an acrylic monomer contains no silicon atom.

A polymer having 90% or more by weight polymerized units of vinyl monomers is a vinyl polymer. A polymer having 55% or more by weight of polymerized units of acrylic monomers are acrylic polymers. A polymer is considered herein to be crosslinked if the polymer contains 0.5% or more by weight polymerized units of multifunctional vinyl monomers. A crosslinked polymer is considered herein to be "fully" crosslinked if in a typical sample of the crosslinked polymer, 20% or less by weight of the polymer is material that is soluble in any solvent.

The category of multifunctional vinyl monomers contains two subcategories: crosslinkers and graftlinkers. In a crosslinker, every polymerizable vinyl group on the molecule is substantially the same as every other polymerizable vinyl group on the molecule. In a graftlinker (iii), at least one polymerizable vinyl group on the molecule is substantially different from at least one other polymerizable vinyl group on the molecule. "Substantially" is defined by the molecular structure as follows. Each polymerizable vinyl group is defined by two carbon atoms and the groups $R^1$, $R^2$, $R^3$, and $R^4$ as shown above in structure (I). The "environment" of each carbon atom is defined herein as the configuration of atoms that is determined by following any path of three covalent bonds from one of the carbon atoms in structure (I). As defined herein, crosslinkers and graftlinkers (iii) contain no silicon atom.

For example, the following molecules are crosslinkers because in each molecule, every polymerizable vinyl group is identical in its chemical environment to every other polymerizable vinyl group in the same molecule: divinyl benzene, ethylene glycol diacrylate, and trimethylolpropane triacrylate. For another example, it useful to consider 1,3 butanediol diacrylate (1,3-BDA):

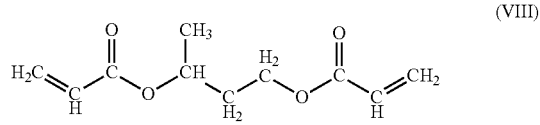

(VIII)

1,3-BDA is a crosslinker, because both of the polymerizable vinyl groups have the same "environment." as defined above. The "environment" of the vinyl group is shown in the following structure (IX):

(IX)

Examples of graftlinkers are allyl methacrylate, allyl acrylate, allyl acryloxypropionate, and diallyl maleate.

Another type of polymer or oligomer are polysiloxane polymers and oligomers. Polysiloxane oligomers and polymers have the structure (X):

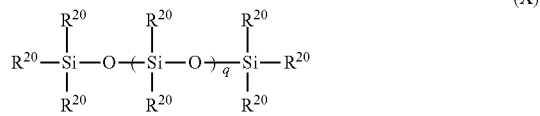

(X)

where each $R^{20}$ is, independently of every other $R^{20}$, hydrogen, a hydrocarbon group, or a substituted hydrocarbon group; and were q is 1 or larger. Some polysiloxane oligomers or polymers have one or more $R^{20}$ group that contains a vinyl group that is capable of undergoing vinyl polymerization; such a polysiloxane oligomer or polymer also fits the category of "vinyl monomer."

One type of vinyl monomer has the structure (X) in which q=0 and in which one or more of the $R^{20}$ groups contains a vinyl group that is capable of undergoing vinyl polymerization.

The measured glass transition temperature (Tg) of a polymer is determined by differential scanning calorimetry (DSC) at 10° C./minute. From the DSC data, a glass transition is detected, and then the temperature of that transition is determined by the midpoint method. The Tg of a monomer is defined as the measured Tg of a homopolymer made from that monomer. It is also useful to define the calculated Tg of a polymer, which is is determined by the Fox equation:

$$\frac{1}{Tg polymer} = \sum_{i=1}^{z} \frac{w_i}{Tgi}$$

where Tgpolymer is the calculated Tg of the polymer (in Kelvin), where there are z monomers, labeled with index i, running from 1 to z; where $w_i$ is the weight fraction of the ith monomer, and where Tgi is the measured Tg (in Kelvin) of a homopolymer of the ith monomer.

A collection of particles is characterized by the diameters. If a specific particle is not spherical, the diameter of that specific particle is taken herein to be the diameter of an imaginary particle that has the same volume as the specific particle. A collection of particles is characterized by the volume-average diameter, which is measured by dynamic light scattering on a dispersion of the particles in a liquid medium.

Polymer particles are said herein to be dispersed in a matrix polymer if the matrix polymer forms a continuous phase and the polymer particles are distributed throughout matrix polymer. The dispersed polymer particles may be distributed randomly or in some non-random pattern.

A compound is considered herein to be water soluble if 2 or more grams of that compound will dissolve in 100 grams of water at 25° C. A compound is considered herein to be water insoluble if the maximum amount of that compound that will dissolve in water at 25° C. is 0.5 gram or less.

Ratios are described herein as follows. For example, if a ratio is said to be 3:1 or greater, that ratio may be 3:1 or 5:1 or 100:1 but may not be 2:1. The general statement of this idea is as follows: when a ratio is said herein to be X:1 or greater, it is meant that the ratio is Y:1, where Y is greater than or equal to X. Similarly, for example, if a ratio is said to be 15:1 or less, that ratio may be 15:1 or 10:1 or 0.1:1 but may not be 20:1. Stated in a general way: when a ratio is said herein to be W:1 or less, it is meant that the ratio is Z:1, where Z is less than or equal to W.

The present invention involves the use of polymer particles. The polymer particle contains a core polymer and a shell polymer. Preferably, the core polymer resides at the center of the polymer particle. In some embodiments, the shell polymer is disposed on the surface of the core polymer; in some embodiments, the shell polymer surrounds the core polymer. Preferably, the core polymer has one or more detectable glass transition temperatures.

The core polymer contains polymerized units of one or more monomer (i). Monomer (i) is defined herein as monomer selected from monomers of structure (I), monomers of structure (II), and mixtures thereof,

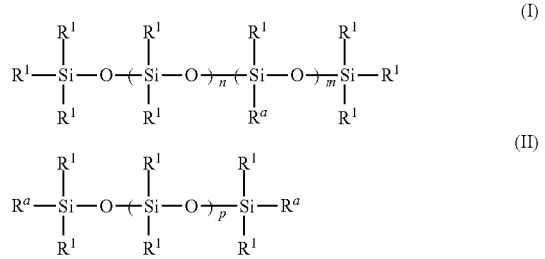

where every $R^1$ is independently hydrogen or a hydrocarbon group; n is 0 to 1,000; m is 2 to 1,000; p is 0 to 1,000; every $R^a$ is independently an organic group that contains one or more ethylenically unsaturated group. In structure (I), the groups in the two sets of parentheses may be arranged in any manner; they may be in two blocks as shown, or in multiple blocks, or alternating, or in statistical order, or in a combination thereof. Preferred is statistical order. That is, it is preferred that the "m" units and "n" units are arranged as in a statistical copolymer.

In structures (I) and (II), preferred $R^1$ groups are hydrogen and hydrocarbon groups having 12 or fewer carbon atoms; more preferably hydrogen and hydrocarbon groups having 8 or fewer carbon atoms; more preferably hydrocarbon groups having 4 or fewer carbon atoms; more preferably methyl groups. In structures (I) and (II), preferably all $R^1$ groups are the same as each other.

In structures (I) and (II), preferred —$R^a$ groups have the structure

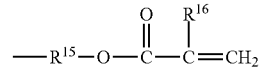

where $R^{15}$ is a hydrocarbon group, preferably an alkyl group. Preferably $R^{15}$ has 8 or fewer carbon atoms; more preferably 5 or fewer; more preferably 3 or fewer. Preferably $R^{15}$ has 1 or more carbon atoms; more preferably 2 or more carbon atoms; more preferably 3 or more carbon atoms. $R^{16}$ is either hydrogen or methyl; preferably methyl. Preferably all $R^a$ groups are the same as each other.

In structure (I), n is preferably 10 or more; more preferably 20 or more; more preferably 50 or more; more preferably 100 or more. In structure (I), n is preferably 800 or less; more preferably 500 or less; more preferably 300 or less. In structure (I), the ratio of n:m is preferably 5:1 or higher; more preferably 10:1 or higher; more preferably 15:1 or higher. In structure (I), the ratio of n:m is preferably 100:1 or lower; more preferably 50:1 or lower; more preferably 30:1 or lower. In structure (II), p is preferably 10 or more; more preferably 20 or more; more preferably 50 or more. In structure (II), p is preferably 800 or less; more preferably 500 or less; more preferably 300 or less.

Monomers of structure (II) are preferred.

The core polymer also contains polymerized units of one or more monovinyl acrylic monomer (ii). Preferred monovinyl acrylic monomers (ii) are acrylic acid, methacrylic acid, unsubstituted-alkyl esters thereof, substituted-alkyl esters thereof, and mixtures thereof. More preferred are acrylic acid, methacrylic acid, unsubstituted-alkyl esters thereof, and mixtures thereof. More preferred are one or more unsubstituted alkyl esters of acrylic acid or methacrylic acid. More preferred are one or more unsubstituted alkyl esters of acrylic acid. Among unsubstituted alkyl esters of acrylic acid and methacrylic acid, preferred are those with alkyl group having 18 or fewer carbon atoms; more preferred is 8 or fewer carbon atoms; more preferred is 6 or fewer carbon atoms; more preferred is 4 or fewer carbon atoms. Among unsubstituted alkyl esters of acrylic acid and methacrylic acid, preferred are those with alkyl group having 2 or more carbon atoms; more preferred is 4 or more carbon atoms.

The core polymer also contains polymerized units of one or more graftlinkers (iii). Preferred graftlinkers (iii) are allyl methacrylate, allyl acrylate, allyl acryloxypropionate, diallyl maleate, and mixtures thereof; more preferred is allyl methacrylate.

Preferably the amount of polymerized units of monomer (i), by weight based on the weight of core polymer, is 40% or more; more preferably 50% or more; more preferably 60% or more; more preferably 70% or more. Preferably the amount of polymerized units of monomer (i), by weight based on the weight of core polymer, is 95% or less; more preferably 90% or less; more preferably 85% or less.

Preferably the sum of the amounts of polymerized units of monomer (i) plus the polymerized units of monovinyl acrylic monomer (ii), plus the polymerized units of the graftlinker (iii), by weight based on the weight of core polymer, is 95% or more; more preferably 98% or more; more preferably 99% or more.

In the core polymer, the weight ratio of all monovinyl acrylic monomers (ii) to all graftlinkers (iii) is preferably 40:1 or higher; more preferably 50:1 or higher; more preferably 75:1 or higher; more preferably 100:1 or higher. In the core polymer, the weight ratio of all monovinyl acrylic monomers (ii) to all graftlinkers (iii) is preferably 500:1 or lower; more preferably 300:1 or lower; more preferably 200:1 or lower.

In the core polymer, preferably the amount of the sum of all monovinyl acrylic monomers (ii) plus all graftlinkers (iii), by weight based on the weight of the core polymer, is 5% or more; more preferably 10% or more; more preferably 15% or more. In the core polymer, preferably the amount of the sum of all monovinyl acrylic monomers (ii) plus all graftlinkers (iii), by weight based on the weight of the core polymer, is 60% or less; more preferably 50% or less; more preferably 40% or less; more preferably 30% or less.

In the core polymer, preferably the ratio of the weight of all monomers (i) to the sum of the weights of all monovinyl acrylic monomers (ii) plus the weights of all graftlinkers (iii), is 0.7:1 or higher; more preferably 1:1 or higher; more preferably 1.5:1 or higher; more preferably 2.3:1 or higher. In the core polymer, preferably the ratio of the weight of all monomers (i) to the sum of the weights of all monovinyl acrylic monomers (ii) plus the weights of all graftlinkers (iii), is 19:1 or lower; more preferably 9:1 or lower.

Preferably, the core polymer has a measured Tg at $-90°$ C. or lower; more preferably $-100°$ C. or lower; more preferably $-115°$ C. or lower; more preferably $-120°$ C. or lower. Preferably, the core polymer also shows a second measured Tg. Preferably, the second measured Tg is $-80°$ C. or higher; more preferably $-70°$ C. or higher; more preferably $-60°$ C. or higher. Preferably, the second measured Tg is $0°$ C. or lower; more preferably $-12°$ C. or lower; more preferably $-40°$ C. or lower.

While the invention is not limited to any specific theory, it is contemplated that the monomer (i), because it has plural polymerizable vinyl groups, acts as a crosslinker, resulting in the relatively low soluble fraction of the core polymer. It is contemplated that, in the graftlinker molecules, many will have had one or more polymerizable vinyl groups react to copolymerize with the monomer (i) while one or more polymerizable vinyl groups will remain unreacted in the core polymer. It is contemplated that such an outcome is possible because some polymerizable groups on the graftlinker are more highly reactive than other groups, and the polymerization conditions of the formation of the core polymer are chosen so that the monomers will copolymerize with each other and with only the more-reactive polymerizable vinyl groups on the graftlinker.

It is further contemplated that some of the vinyl groups on monomer (i) copolymerize with acrylic monomer. It is further contemplated that, despite this copolymerization, the polymerized units of acrylic monomer segregate fully or partially from the polymerized units of monomer (i), and that segregation gives rise to two separate phases within the core polymer, resulting in two measured Tgs.

The polymer particle of the present invention also contains a shell polymer, which contains polymerized units of one or more acrylic monomer. The shell polymer is preferably polymerized in the presence of the core polymer. Preferably the amount of polymerized units of acrylic monomer in the shell polymer is, by weight based on the weight of all monomers added to the core polymer to form the shell polymer, 90% or more; more preferably 95% or more; more preferably 99% or more.

In considering the shell polymer, it is useful to also consider the fate of the graftlinkers that were used in making the core polymer. Preferably, when the core polymer was polymerized, some or all of the graftlinkers went through the polymerization process of making the core polymer by reacting one or more polymerizable vinyl group but leaving one or more additional polymerizable vinyl group unreacted. That is, preferably, the core polymer has unreacted polymerizable vinyl groups attached to it. Preferably, when monomers used in making the shell polymer are polymerized in the presence of the core polymer, some of those monomers will copolymerize with those unreacted polymerizable vinyl groups attached to the core polymer, and some of those monomers will polymerize with each other. Preferably, aside from those unreacted polymerizable vinyl groups, the shell polymer contains no polymerized units of multivinyl monomer.

Preferably, the shell polymer contains polymerized units of one or more acrylic monomer. Preferred acrylic monomers are acrylic acid, methacrylic acid, unsubstituted-alkyl esters thereof, substituted-alkyl esters thereof, and mixtures thereof. More preferred are acrylic acid, methacrylic acid, unsubstituted-alkyl esters thereof, and mixtures thereof. More preferred are one or more unsubstituted alkyl esters of acrylic acid or methacrylic acid. More preferred are one or more unsubstituted alkyl esters of methacrylic acid. In the shell polymer, among unsubstituted alkyl esters of acrylic acid and methacrylic acid, preferred are those in which the alkyl group has 4 or fewer carbon atoms; more preferably 3 or fewer carbon atoms; more preferably 2 or fewer carbon atoms, more preferably one carbon atom. In a preferred embodiment, methyl methacrylate is the only monomer added to the core polymer to form the shell polymer by polymerization in the presence of the core polymer.

It is useful to characterize the monomer or mixture of monomers that are used in making the shell polymer by finding the calculated Tg, as defined herein above. The calculation of the calculated Tg uses the monomers that are added to form the shell polymer and ignores the possibility that those monomers might copolymerize with the unreacted polymerizable vinyl groups attached to the core polymer. Preferably, the calculated Tg of the shell polymer is $50°$ C. or higher; more preferably $75°$ C. or higher; more preferably $85°$ C. or higher. Preferably, the calculated Tg of the shell polymer is $150°$ C. or lower.

Preferably, the polymer particle of the present invention contains a polymer phase (called herein the "shell phase") that contains shell polymer and that is separate from the core polymer. It is expected that some of the shell polymer chains in the shell phase are grafted to core polymer chains. The existence of a separate shell phase may be observed, for example by atomic force microscopy (AFM). A collection of the polymer particles may be heated and pressed into a film, which may be analyzed by AFM. Preferably, a separate shell phase is observed. In some embodiments, a shell phase that is observable by AFM does not exhibit a separate Tg when analyzed by DSC.

The core/shell polymer of the present invention may be characterized by the soluble fraction. The soluble fraction is measured by bringing a sample of the polymer into contact with tetrahydrofuran (THF) and mixing thoroughly. Then the polymer that has not dissolved is removed by centrifugation and filtration. The resulting solution of polymer dissolved in THF is then analyzed by nuclear magnetic resonance (NMR) spectroscopy. The NMR spectroscopy reveals the relative amounts of core polymer and shell polymer dissolved in the THF. The solution of polymer in THF is dried, and the weight of the dry polymer is measured. From these data (the initial weight of the sample of core/shell polymer, the proportions of core polymer and shell polymer in the sample, the weight of the dried solution, and the relative amounts of core and shell polymers in the solution), the soluble fraction of the core polymer is determined. Soluble fraction of the core polymer is the weight of core polymer dissolved in the THF, divided by the weight of core polymer that was in the sample of core/shell polymer, expressed as a percentage. Preferably, the soluble fraction of the core polymer is 1% or more; more preferably 2% or more. Preferably the soluble fraction of the core polymer is 30% or less; more preferably 20% or less; more preferably 10% or less.

Similarly, the soluble fraction of the shell polymer is the weight of shell polymer dissolved in the THF, divided by the weight of all the polymerized units of the monomers that were added to the core polymer to make the shell polymer that was in the sample of core/shell polymer, expressed as a percentage.

The procedure that is used for determining soluble fraction can also be used to determine the extent of grafting of the shell polymer. Some of the polymer chains in the shell polymer will be grafted to the core polymer (via copolymerization with graftlinker) and some of the polymer chains will not be grafted to the core polymer. Many of the polymer chains in the shell polymer that graft to the core polymer will be grafted to a portion of the core polymer that is crosslinked and therefore insoluble, and those polymer chains of the shell polymer will also be insoluble. The % grafting is then determined as follows:

% grafting=100*(Wshell0−Wshellsol)/Wshell0 where Wshell0 is the weight of shell polymer in the original sample, and Wshellsol is the weight of shell polymer dissolved in the THF.

Preferably, the % grafting of the shell polymer is 10% or more; more preferably 15% or more; more preferably 20% or more. Preferably, the % grafting of the shell polymer is 85% or less; more preferably 75% or less; more preferably 65% or less.

The composition of the present invention may be made by any method. A preferred method of making the composition is as follows.

Preferably, a mixture (M1) is made of one or more monomer (i), one or more monovinyl acrylic monomer (ii), and one or more graftlinker (iii). The suitable and preferred types and amounts of monomer (i), monovinyl acrylic monomer (ii), and graftlinker (iii) are the same as those described herein above for the core polymer.

Preferably, mixture (M1) is then brought into contact with water and surfactant to form mixture (M2). The surfactant may be cationic, nonionic, or anionic; preferred are nonionic and anionic; more preferred are anionic surfactants. Preferably the amount of surfactant, by weight based on the weight of mixture (M1), is 0.1% or more; more preferably 0.2% or more. Preferably the amount of surfactant, by weight based on the weight of mixture (M1), is 5% or less; more preferably 2% or less; more preferably 1% or less.

Preferably mixture (M1) has viscosity at 25° C. of 10 mPa*s or less, as measured in a cone and plate rheometer under steady shear at 100 sec$^{-1}$.

Preferably the amount of water in mixture (M2) is, by weight based on the weight of mixture (M2), 55% or more; more preferably 65% or more. Preferably the amount of water in mixture (M2) is, by weight based on the weight of mixture (M2), 95% or less; more preferably 85% or less.

Preferably, the mixture (M2) is mechanically agitated to form an emulsion (E1), in which droplets of mixture (M1) are dispersed in water. Preferred methods of agitation employ ultrasound. Preferably the volume-average droplet size in emulsion (E1) is 500 nm or less.

Preferably, also present in the emulsion (E1) is one or more initiators. Preferred initiators are water insoluble thermal initiators, water soluble redox initiators, and mixtures thereof. Redox initiators react with reductants, sometimes in the presence of a catalyst, to produce radicals that initiate vinyl polymerization. Preferred water soluble redox initiators are persulfates (including, for example, sodium persulfate, potassium persulfate, and ammonium persulfate) and hydroperoxides (including, for example, t-butyl hydroperoxide, hydrogen peroxide, and 1-methyl-1-(4-methylcyclohexyl/ethyl hydroperoxide). Preferred reductants are sodium bisulfite, ascorbic acid, tetramethyl ethylene diamine, and sodium metabisulfite. Preferred catalysts are ethylenediamine tetraacetic acid and ferrous sulfate.

Thermal initiators are stable at room temperature but decompose at elevated temperature to produce radicals that initiate vinyl polymerization. The decomposition of a thermal initiator is characterized by the half life at 72° C. Preferred thermal initiators have half life at 72° C. of 3 hours or less; more preferably 2 hours or less. Preferred thermal initiators have half life at 72° C. of 20 minutes or more; more preferably 30 minutes or more; more preferably 40 minutes or more. Preferred thermal initiators are peroxides and azo compounds. Among peroxides, preferred are peroxyesters (also sometimes called percarboxylic esters or peroxycarboxylic esters), peroxydicarbonates, peroxides (such as, for example, dialkyl peroxides and diacyl peroxides), peroxyketals, and ketone peroxides.

Preferably, emulsion (E1) contains one or more water soluble redox initiator and one or more water insoluble thermal initiator.

Preferably, emulsion (E1) is heated to 40° C. or higher, and polymerization is allowed to take place. Preferably polymerization takes place within the droplets of mixture (M1), and the polymer is formed as particles of solid polymer dispersed in water. This type of polymerization is known as "mini-emulsion" polymerization. The result is a dispersion (D1) of particles of core polymer in water.

Preferably, a mixture (M2) of monomers is made and then mixed with one or more anionic surfactant and with water to form an emulsion (E2). Preferably, emulsion (E2) is combined with dispersion (D1) and one or more water-soluble initiator, and the resulting mixture (M3) is heated to 70° C. or higher. Preferably, under these conditions, a process of emulsion polymerization takes place, in which monomer molecules from emulsion (E2) diffuse through the water to the particles of core polymer, where polymerization of the monomer molecules from (E2) takes place, preferably copolymerizing with the available polymerizable vinyl groups attached to the core polymer.

Preferably, after polymerization of the shell polymer, the result is a dispersion (D2) of polymer particles in water. It is contemplated that these particles are the core/shell polymer particles of the present invention. Preferably the volume-average diameter of the particles is 100 nm or larger; more preferably 200 nm or more. Preferably the volume-average diameter of the particles is 1,000 nm or less; more preferably 750 nm or less; more preferably 500 nm or less. Preferably, the amount of polymer in dispersion (D2) is, by weight based on the total weight of dispersion (D2), 15% or more; more preferably 20% or more. Preferably, the amount of polymer in dispersion (D2) is, by weight based on the total weight of dispersion (D2), 40% or lower; more preferably 30% or lower.

Dispersion (D2) may optionally be dried to remove water. Suitable methods of drying include freeze drying, spray drying, and coagulation followed by belt drying and fluid-bed drying. The resulting composition dried composition preferably has an amount of water, by weight based on the weight of dried composition, of 10% or less; more preferably 5% or less.

Polymer particles of the present invention may be used for any purpose. One preferred use is to add a plurality of the particles to a matrix polymer. It is contemplated that adding the particles to a matrix polymer will improve the impact resistance of the matrix polymer. Preferred matrix polymers are polyvinyl chloride, polycarbonate, polystyrene, styrene/acrylonitrile copolymers, polymethyl methacrylate, and mixtures thereof. Preferred is polyvinyl chloride. Preferably the amount of the particles of the present invention is, in parts by weight per hundred parts by weight of the matrix polymer (phr), 1 phr or more; more preferably 2 phr or more; more preferably 3 phr or more. Preferably the amount of the particles of the present invention is, in parts by weight per hundred parts by weight of the matrix polymer (phr), 10 phr or less; more preferably 8 phr or less.

Preferably, the polymer particles of the present invention are dispersed in the matrix polymer. The dispersed polymer particles may be distributed randomly or in some nonrandom way, or a combination thereof. An example of nonrandom distribution of dispersed particles is strings that are rich in polymer particles and poor in matrix polymer.

The following are examples of the present invention.
The following abbreviations and materials were used:
TSO-1=telechelic silicone oil, having the following structure, where p=198:

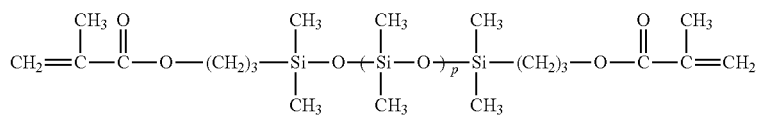

BA=butyl acrylate
ALMA=allyl methacrylate
MMA=methyl methacrylate
SLS=sodium lauryl sulfate
NaPS=sodium persulfate
PVC=polyvinyl chloride
pbw=parts by weight
phr=parts by weight per 100 parts by weight of resin

EXAMPLE 1

A mixture (M0) was prepared of 99.3 parts by weight BA and 0.7 parts by weight ALMA. Then a mixture (M1) was prepared of 75 parts by weight TSO-1 and 25 parts by weight of the BA/ALMA mixture (M0). The mixture (M1) was combined with water and SLS (0.5% SLS by weight based on the weight of M1). The mixture M1 was emulsified with an ultrasonic processor which works on the principle of cavitation to form emulsion E1. The amount of mixture M1 was 25% by weight based on the weight of emulsion E1. The emulsion E1 was transferred to a round bottom flask and polymerized with a redox initiation system of t-butyl hydroperoxide (tBHP), ferrous sulfate and sodium formaldehyde sulfoxylate (SFS). The system also contained Trigonox 125 (t-amyl peroxypivalate) at 1% based on total monomer, an oil soluble thermal initiator with a half-life of about 1 hour at 72° C. This stage was heated to 45° C. and exothermed to about 65° C. The result was a dispersion of core polymer particles.

An emulsion of MMA was made and added, at 20 parts by weight MMA to 80 parts by weight of solid core polymer, and the mixture was heated to 80° C., and NaPs was added. The mixture was held at 85° C., then cooled to 23° C. The result was a dispersion of core/shell polymeric particles in water. The dispersion was then freeze dried to obtain the polymeric particles in solid form.

Example 1 was analyzed with DSC as described above, and all of the detected glass transitions are reported. Example 1 was also analyzed as described above for the soluble fraction (SF) of the core polymer and % grafting (% G) of the shell polymer. The dispersion of core/shell polymer was also analyzed by dynamic light scattering for the volume-average diameter (D). Also measured was the solids (% by weight). Results are in Tables Ia and Ib.

TABLE Ia

| | | | Example 1 | | |
|---|---|---|---|---|---|
| Example | p | TSO (pbw) | BA/ALMA mixture (pbw) | lowest Tg (° C.) | highest Tg (° C.) |
| 1 | 198 | 20 | 60 | −129 | −48 |

TABLE Ib

| | | Example 1 | | | |
|---|---|---|---|---|---|
| Example | D (nm) | solids (%) | Core SF (%) | Total SF (%) | shell grafting (%) |
| 1 | 241 | 27.3 | 5.1% | 13.5% | 58 |

EXAMPLE 2

A variety of additional core/shell polymers were made. Each was similar to Example 1. Various telechelic silicone oils (TSO) were used, all having the same structure as TSO-1, with various values of p. Variations were made in the relative amounts of different ingredients in the core polymer. In every example, the BA/ALMA ratio was 99.3/0.7 by weight, the amount of SLS was 0.5% by weight based on the dry weight of the core/shell polymer, and the weight ratio of core polymer to shell polymer was 80/20.

The examples were was analyzed with DSC as described above, and all of the detected glass transitions are reported. The examples were also analyzed as described above for the soluble fraction (SF) of the core polymer and % grafting (% G) of the shell polymer. The dispersions of core/shell polymer were also analyzed by dynamic light scattering for the volume-average diameter (D). Also measured were the solids (% by weight). Results are shown in Tables II and III.

TABLE II

| Example | TSO p | BA/ALMA mixture (pbw) | lowest Tg (° C.) | highest Tg (° C.) |
|---|---|---|---|---|
| 1 | 198 | 20 | 60 | −129 | −48 |
| 2-1 | 183 | 10 | 70 | −125 | −47 |
| 2-2 | 183 | 20 | 60 | −128 | −46 |
| 2-3 | 95 | 10 | 70 | −125 | −46 |
| 2-4 | 95 | 20 | 60 | −128 | −48 |

TABLE III

| Example | D (nm) | solids (%) | Core SF (%) | Total SF (%) | shell grafting (%) |
|---|---|---|---|---|---|
| 1 | 241 | 27.3 | 5.1 | 13.5 | 58.0 |
| 2-1 | 208 | 27.8 | 6.2 | 18.6 | 38.0 |
| 2-2 | 250 | 29.8 | 5.7 | 16.8 | 44.5 |
| 2-3 | 236 | 33.4 | 5.7 | 15.2 | 52.5 |
| 2-4 | 239 | 32.8 | 5.4 | 20.0 | 27.0 |

EXAMPLE 3—IMPACT TESTING

The examples were also tested for effectiveness as impact modifiers in PVC. A typical formulation of nonplasticized PVC was used, with 4, 5, or 6 phr of dry modifier per 100 parts by weight of PVC. The formulation was mixed and then milled on a heated plastics-processing two-roll mill, then pressed into a plaque. Impact resistance was tested by the notched Izod impact test (ASTM D256, American Society of Testing and Materials, Conshohocken PA, USA) at 23° C. Ten replicate samples were tested for each example.

Also tested were PVC samples formulated with a comparative impact modifier. The comparative modifier was a core/shell polymer made by conventional two stage emulsion polymerization. A core polymer of BA/ALMA was polymerized, and then a shell polymer of MMA was polymerized, with a core/shell weight ratio of 80/20.

Impact results are (1) the energy required to break the sample and (2) the percentage of the replicate samples that broke in a ductile fashion rather than a brittle fashion. Higher energy and higher percent ductile breaks each indicate better impact resistance. Impact results are shown in Table IV.

TABLE IV

| Example | phr | Energy (N*m/cm (ft*lb/in)) | % ductile |
|---|---|---|---|
| comparative | 4 | 3.34 | 0 |
| 1 | 4 | 3.49 | 0 |
| 2-1 | 4 | 5.52 | 10 |
| 2-2 | 4 | 5.86 | 10 |
| 2-3 | 4 | 7.62 | 20 |
| 2-4 | 4 | 11.70 | 50 |
| comparative | 5 | 3.18 | 0 |
| 1 | 5 | 21.85 | 100 |
| 2-1 | 5 | 22.83 | 100 |
| 2-2 | 5 | 21.28 | 100 |
| 2-3 | 5 | 24.00 | 100 |
| 2-4 | 5 | 18.86 | 90 |
| comparative | 6 | 17.22 | 70 |
| 2-1 | 6 | 22.13 | 90 |
| 2-2 | 6 | 22.67 | 90 |
| 2-3 | 6 | 25.56 | 100 |
| 2-4 | 6 | 24.04 | 100 |

When comparisons are made among modifiers used at equal phr levels, it is clear that all of the inventive examples show better impact resistance than the comparative example.

EXAMPLE 4: ATOMIC FORCE MICROSCOPY (AFM)

Examples 2-1 and 2-2 were tested as follows. An aqueous dispersion of polymer particles was freeze dried to produce a collection of the polymer particles in solid form. The solid sample was pressed into a film, and the surface was studied by AFM. Both samples showed three phases: a phase rich in silicone, a phase rich in poly(BA), and a phase rich in poly(MMA). In Example 2-2, the size of the domains of the phase rich in silicone were larger than in Example 2-1.

The invention claimed is:

1. A method of making a collection of core/shell polymer particles comprising
   (A) performing free radical polymerization (A) on an emulsion (E1) that comprises a collection of droplets dispersed in an aqueous medium, wherein the droplets comprise
   (i) one or more monomers selected from monomers of structure (II),

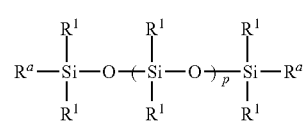

(II)

wherein every $R^1$ is independently hydrogen or a hydrocarbon group; p is 0 to 1,000; every $R^a$ is independently an organic group that contains one or more ethylenically unsaturated group;
   (ii) one or more monovinyl acrylic monomers; and
   (iii) one or more graftlinkers that have no silicon atoms;
   to form a dispersion (D1) of core polymer particles in the aqueous medium;
   (B) in the presence of the dispersion (D1) of core polymer particles, performing aqueous emulsion polymerization (B) on one or more acrylic monomers to form a shell on the core polymer particles, wherein the % grafting of the shell polymer is from 15% to 85%.
2. The method of claim 1, wherein the free radical polymerization (A) takes place within the droplets.

3. The method of claim 1, wherein the emulsion (E1) additionally comprises one or more anionic surfactant.

4. The method of claim 1, wherein the emulsion (E1) additionally comprises one or more water soluble redox initiator and one or more water insoluble thermal initiator.

5. The method of claim 1, wherein the emulsion polymerization (B) is performed using one or more water soluble initiator.

6. The method of claim 1, wherein the volume-average droplet size in emulsion (E1) is 500 nm or less.

* * * * *